US011438328B2

(12) United States Patent
Dachev et al.

(10) Patent No.: US 11,438,328 B2
(45) Date of Patent: Sep. 6, 2022

(54) METHODS AND APPARATUS TO REFRESH A TOKEN

(71) Applicant: VMware, Inc., Palo Alto, CA (US)

(72) Inventors: Martin Dachev, Sofia (BG); George P Dimitrov, Sofia (BG)

(73) Assignee: VMWARE, INC., Palo Alto, CA (US)

( * ) Notice: Subject to any disclaimer, the term of this patent is extended or adjusted under 35 U.S.C. 154(b) by 43 days.

(21) Appl. No.: 16/864,084

(22) Filed: Apr. 30, 2020

(65) Prior Publication Data

US 2021/0344670 A1    Nov. 4, 2021

(51) Int. Cl.
*H04L 9/40*        (2022.01)
(52) U.S. Cl.
CPC ................ *H04L 63/0846* (2013.01)
(58) Field of Classification Search
CPC .................................. H04L 63/0846
See application file for complete search history.

(56) References Cited

U.S. PATENT DOCUMENTS

| | | | | | |
|---|---|---|---|---|---|
| 2012/0003923 | A1* | 1/2012 | Pazos | ............... | H04N 21/47211 455/3.06 |
| 2012/0060210 | A1* | 3/2012 | Baker | ................. | H04L 63/0807 726/9 |
| 2014/0026193 | A1* | 1/2014 | Saxman | ................... | G06F 21/33 726/4 |
| 2014/0096224 | A1* | 4/2014 | Liu | ...................... | H04L 63/0807 726/9 |
| 2015/0236908 | A1* | 8/2015 | Kim | ........................ | H04L 67/32 709/221 |
| 2015/0350186 | A1* | 12/2015 | Chan | ................... | H04L 63/0807 726/9 |
| 2016/0224782 | A1* | 8/2016 | Miyakawa | .......... | H04L 63/0838 |
| 2017/0161973 | A1* | 6/2017 | Katta | ..................... | G06Q 40/08 |
| 2021/0218800 | A1* | 7/2021 | Landman | ............ | H04L 63/0823 |

OTHER PUBLICATIONS

Ergen et al., "WTRP—Wireless Token Ring Protocol", Nov. 2004, IEEE Transactions on Vehicular Technology, pp. 1863-1881 (Year: 2004).*

* cited by examiner

*Primary Examiner* — Kenneth W Chang
(74) *Attorney, Agent, or Firm* — Hanley, Flight & Zimmerman LLC

(57) ABSTRACT

Methods, apparatus, systems, and articles of manufacture to refresh a token for use in a virtualized computing environment are disclosed. An example method includes accessing a request to perform an automation task; extracting a first token from the request to perform the automation task; determining, by executing an instruction with a processor, whether the first token is expired or will expire in a threshold amount of time; in response to determining that the first token is expired or will expire in the threshold amount of time, requesting a refreshed token; replacing the first token with the refreshed token to create an updated request; and sending the updated request to an automation executor.

19 Claims, 9 Drawing Sheets

METHODS AND APPARATUS TO REFRESH A TOKEN

FIELD OF THE DISCLOSURE

This disclosure relates generally to cloud computing, and, more particularly, to methods and apparatus to refresh a token for use in a virtualized computing environment.

BACKGROUND

Virtualizing of computer systems provides benefits such as an ability to execute multiple computer systems on a single hardware computer, replicating computer systems, moving computer systems among multiple hardware computers, and so forth.

"Infrastructure-as-a-Service" (also commonly referred to as "IaaS") generally describes a suite of technologies provided by a service provider as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace than ever before.

Cloud computing environments may include many processing units (e.g., servers). Other components of a cloud computing environment include storage devices, networking devices (e.g., switches), etc. Current cloud computing environment configuration relies on much manual user input and configuration to install, configure, and deploy the components of the cloud computing environment.

Figure 1:
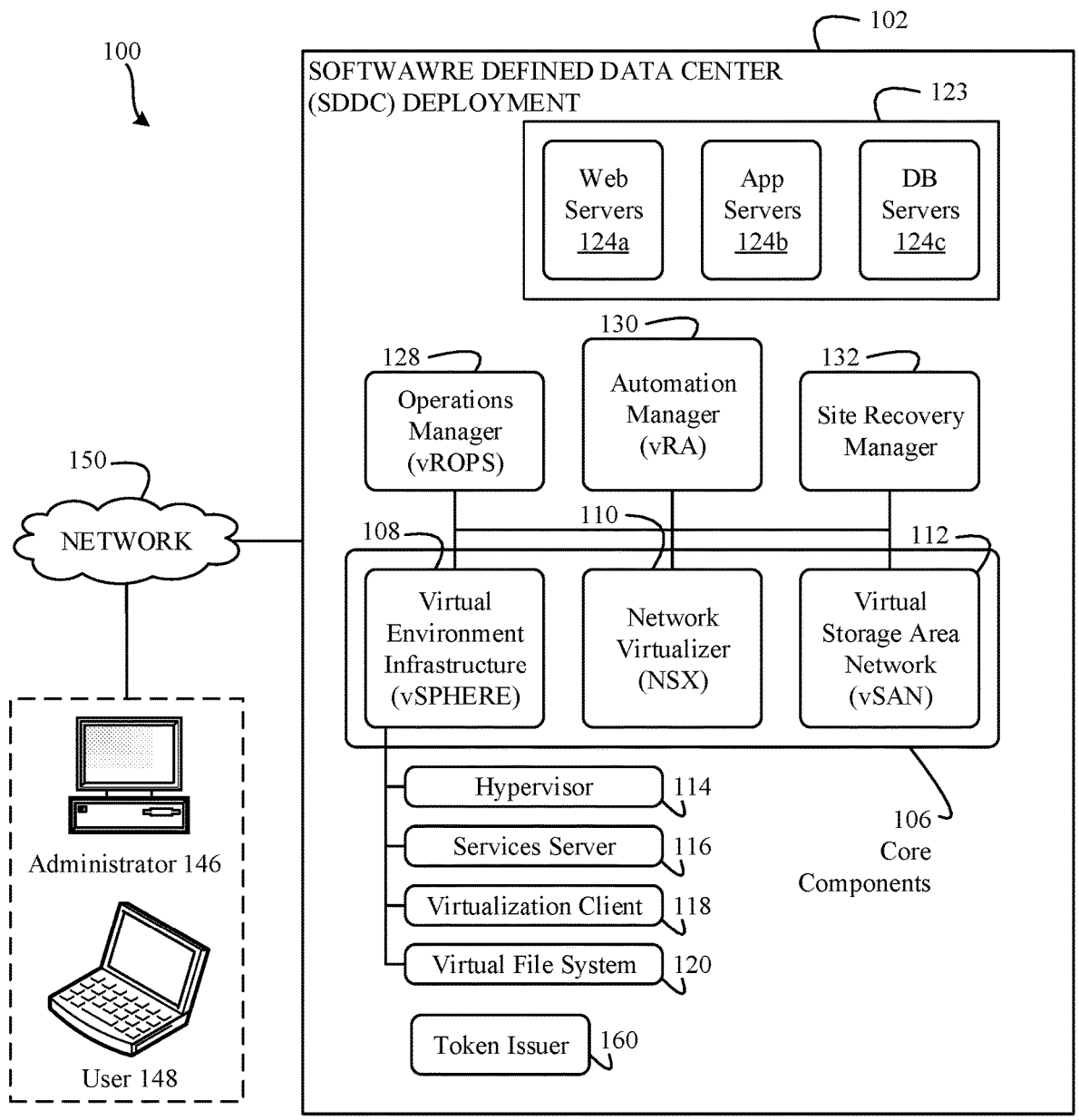
FIG. 1 illustrates an example environment of use including a software-defined data center (SDDC) implemented in accordance with the teachings of this disclosure.

The figures are not to scale. Instead, the thickness of the layers or regions may be enlarged in the drawings. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Cloud computing platforms may provide many powerful capabilities for performing computing operations. However, taking advantage of these computing capabilities manually may be complex and/or require significant training and/or expertise. Prior techniques for providing cloud computing platforms and services often require customers to understand details and configurations of hardware and software resources to establish and configure the cloud computing platform. Configuring such cloud computing platforms may involve long running operations and/or complex operations (e.g., a sequence of operations including multiple steps).

For example, an operation to deploy an application on a virtual machine may involve provisioning a virtual host, installing an operating system on the virtual host, and configuring an application for execution on the operating system. Each of such operations may be authorized in the context of a user session that is initialized based on a user (e.g., an administrator) providing their credentials. To prevent unauthorized access, user sessions typically have a relatively short expiration timeout (e.g., a session timeout of minutes, hours, etc.). In an example where the user session has a thirty minute timeout, while a first operation (e.g., deploying the virtual host) may be allowed to complete in the context of the user session. However, the session may expire prior to execution of the second operation, resulting in a failure of the deployment. Methods and apparatus disclosed herein enable refresh of user tokens to prevent such failures.

A software defined data center (SDDC) is a data storage facility implemented using an infrastructure that is virtualized and delivered as a service to one or more customers. After deployment of a SDDC, the SDDC provides policy-driven automation to enable provisioning and ongoing management of logical compute resources, storage resources, and network resources. For example, customers may select/create policies that cause the SDDC to deploy applications quickly based on policy-driven provisioning that dynamically matches resources to continually changing workloads and business demands. An SDDC can be deployed as a private cloud, a hybrid cloud, or a public cloud and can run on multiple hardware stacks, hypervisors, and clouds.

A virtual machine (VM) is a software computer that, like a physical computer, runs an operating system and applications. An operating system installed on a virtual machine is referred to as a guest operating system. Because each virtual machine is an isolated computing environment, virtual machines (VMs) can be used as desktop or workstation environments, as testing environments, to consolidate server applications, etc. Virtual machines can run on hosts or clusters. The same host can run a plurality of VMs, for example.

As disclosed in detail herein, methods and apparatus disclosed herein enable automatic refresh of tokens used in deployment, configuration, and management of SDDCs and virtual machine resources in cloud computing platforms. The improvements to cloud management systems (e.g., management systems from VMware® such as the vCloud Automation Center™ (vCAC) from VMware®, the vRealize® Automation Cloud Automation Software from VMware®, or management systems from any other entity), interfaces, portals, etc. disclosed herein may be utilized individually and/or in any combination. For example, all or a subset of the described improvements may be utilized.

As used herein, availability refers to the level of redundancy required to provide continuous operation expected for the workload domain. As used herein, performance refers to the computer processing unit (CPU) operating speeds (e.g., CPU gigahertz (GHz)), memory (e.g., gigabytes (GB) of random access memory (RAM)), mass storage (e.g., GB hard drive disk (HDD), GB solid state drive (SSD)), and power capabilities of a workload domain. As used herein, capacity refers to the aggregate number of resources (e.g., aggregate storage, aggregate CPU, etc.) across all servers associated with a cluster and/or a workload domain. In examples disclosed herein, the number of resources (e.g., capacity) for a workload domain is determined based on the redundancy, the CPU operating speed, the memory, the storage, the security, and/or the power requirements selected by a user. For example, more resources are required for a workload domain as the user-selected requirements increase (e.g., higher redundancy, CPU speed, memory, storage, security, and/or power options require more resources than lower redundancy, CPU speed, memory, storage, security, and/or power options).

Example Virtualization Environments

Many different types of virtualization environments exist. Three example types of virtualization environments are: full virtualization, paravirtualization, and operating system virtualization.

Full virtualization, as used herein, is a virtualization environment in which hardware resources are managed by a hypervisor to provide virtual hardware resources to a virtual machine. In a full virtualization environment, the virtual machines do not have direct access to the underlying hardware resources. In a typical full virtualization environment, a host operating system with embedded hypervisor (e.g., a VMware ESXi™ hypervisor) is installed on the server hardware. Virtual machines including virtual hardware resources are then deployed on the hypervisor. A guest operating system is installed in the virtual machine. The hypervisor manages the association between the hardware resources of the server hardware and the virtual resources allocated to the virtual machines (e.g., associating physical random access memory (RAM) with virtual RAM). Typically, in full virtualization, the virtual machine and the guest operating system have no visibility and/or direct access to the hardware resources of the underlying server. Additionally, in full virtualization, a full guest operating system is typically installed in the virtual machine while a host operating system is installed on the server hardware. Example full virtualization environments include VMware ESX®, Microsoft Hyper-V®, and Kernel Based Virtual Machine (KVM).

Paravirtualization, as used herein, is a virtualization environment in which hardware resources are managed by a hypervisor to provide virtual hardware resources to a virtual machine and guest operating systems are also allowed direct access to some or all of the underlying hardware resources of the server (e.g., without accessing an intermediate virtual hardware resource). In a typical paravirtualization system, a host operating system (e.g., a Linux-based operating system) is installed on the server hardware. A hypervisor (e.g., the Xen® hypervisor) executes on the host operating system. Virtual machines including virtual hardware resources are then deployed on the hypervisor. The hypervisor manages the association between the hardware resources of the server hardware and the virtual resources allocated to the virtual machines (e.g., associating physical random access memory (RAM) with virtual RAM). In paravirtualization, the guest operating system installed in the virtual machine is configured also to have direct access to some or all of the hardware resources of the server. For example, the guest operating system may be precompiled with special drivers that allow the guest operating system to access the hardware resources without passing through a virtual hardware layer. For example, a guest operating system may be precompiled with drivers that allow the guest operating system to access a sound card installed in the server hardware. Directly accessing the hardware (e.g., without accessing the virtual hardware resources of the virtual machine) may be more efficient, may allow for performance of operations that are not supported by the virtual machine and/or the hypervisor, etc.

Operating system virtualization is also referred to herein as container virtualization. As used herein, operating system virtualization refers to a system in which processes are isolated in an operating system. In a typical operating system virtualization system, a host operating system is installed on the server hardware. Alternatively, the host operating system may be installed in a virtual machine of a full virtualization environment or a paravirtualization environment. The host operating system of an operating system virtualization system is configured (e.g., utilizing a customized kernel) to provide isolation and resource management for processes that execute within the host operating system (e.g., applications that execute on the host operating system). The isolation of the processes is known as a container. Several containers may share a host operating system. Thus, a process executing within a container is isolated from other processes executing on the host operating system. Thus, operating system virtualization provides isolation and resource management capabilities without the resource overhead utilized by a full virtualization environment or a paravirtualization environment. Alternatively, the host operating system may be installed in a virtual machine of a full virtualization environment or a paravirtualization environment. Example operating system virtualization environments include Linux Containers LXC and LXD, Docker™, OpenVZ™, etc.

In some instances, a SDDC (or a pool of linked SDDCs) may include multiple different virtualization environments. For example, a SDDC may include hardware resources that are managed by a full virtualization environment, a paravirtualization environment, and an operating system virtualization environment. In such an SDDC, a workload may be deployed to any of the virtualization environments.

FIG. 1 illustrates an example environment of use 100 including a software-defined data center (SDDC) 102 implemented in accordance with the teachings of this disclosure. The example SDDC 102 of the illustrated example of FIG. 1 includes core components 106, deployed servers 123, an operations manager 128, an automation manager 130, a site recovery manager 132, and a token issuer 160. An example administrator 146 and/or user 148 access the SDDC 102 via a network 150.

The example core components 106 of the illustrated example include a virtual environment infrastructure 108, an example network virtualizer 110, and an example virtual storage area network 112. The example virtual environment infrastructure 108 is a virtualization platform that includes an example hypervisor 114, an example services server 116, an example virtualization client 118, and example virtual file system 120. In the illustrated example, the virtual environment infrastructure 108 may be implemented using the vSphere virtualization suite developed and sold by VMware® of Palo Alto, Calif., United States. The example hypervisor 114 may be implemented using the VMware ESXi™ hypervisor developed and sold by VMware® The example services server 116 may be implemented using the VMware vCenter® Server developed and sold by VMware® The example virtualization client 118 may be implemented using the VMware vSphere® client developed and sold by VMware®. The example virtual file system 120 may be implemented using the VMware vSphere Virtual Machine File System developed and sold by VMware® Additionally or alternatively, some or all of the components of the virtual environment infrastructure 108 may be implemented using products, software, systems, hardware, etc. from companies other than VMware. In other examples, the virtual environment infrastructure 108 may include additional or different components other than those shown in FIG. 1.

The example network virtualizer 110 is a network virtualization platform that may be used to provide virtual network resources for network computing environments. The example network virtualizer 110 may be implemented using the VMware NSX® network virtualization platform developed and sold by VMware®. The example virtual storage area network 112 is a data storage virtualization platform that may be used to provide virtual data store resources for network computing environments. The example virtual storage area network 112 may be implemented using the VMware® Virtual SAN™ (vSAN) software-defined storage platform developed and sold by VMware®. Additionally or alternatively, the network virtualizer 110 and/or the virtual storage area network 112 may be implemented using products from companies other than VMware®.

In the illustrated example of FIG. 1, one or more VMs (or containers) are used to implement the deployed servers 123. In the illustrated example, the servers 123 include one or more example web servers 124*a*, one or more example app servers 124*b*, and one or more database (DB) servers 124*c*.

The servers 123 are deployed and/or configured by one or more of an example operations manager 128, an example automation manager 130, and an example site recovery manager 132. The example operations manager 128 is provided to automate information technology (IT) operations management of the SDDC 102 to run the servers 123. The example operations manager 128 may be implemented using the VMware® vRealize® Operations (vROPS) IT Operations Management product developed and sold by VMware®. The example operations manager 128 is provided to automate responsive actions to business needs in real-time to deliver personalized infrastructure, applications, and IT operations when business needs arise within the SDDC 102. The example automation manager 130 may be implemented using the VMware's vRealize® Automation (vRA) product developed and sold by VMware®. The example site recovery manager 132 is provided to implement different levels of availability of the SDDC 102 for different servers 123. For example, some servers 123 may require higher levels of redundancy or network rerouting capabilities to ensure a higher level of availability for services (e.g., access to the servers 123 and/or underlying data) even during resource failures. In some examples, other, non-critical servers 123 may only require low to moderate availability. The example site recovery manager 132 may be implemented using the VMware® Site Recovery Manager Disaster Recovery Software developed and sold by VMware®.

The example token issuer 160 provides user tokens that enable management of user sessions. Such tokens may be issued in response to a login event (e.g., a user providing their credentials), a request for a refreshed token, etc. The example token issuer 160 may be implemented using a Cloud Services Platform (CSP) developed and sold by VMware®. However, any other system that can provide tokens (e.g., in response to user login events) may additionally or alternatively be used such as, for example, an OAuth authorization server. Moreover, while in the illustrated example of FIG. 1 the token issuer 160 is shown as a component of the SDDC 102, in some examples, the token issuer 160 may be implemented externally to the SDDC.

In examples disclosed herein, the user tokens provided by the token issuer 160 are limited with respect to their lifetime. That is, after some time (e.g., thirty minutes), the user token will expire and future activities under the session supported by the user token will not be performed and/or may require the user to log in again. In examples disclosed herein, the temporal lifespan of the user token is set to a short duration (e.g., thirty minutes, one hour, etc.) to prevent unauthorized access to the SDDC 102. However, any other token lifespan may additionally or alternatively be used.

During complex deployment situations, multiple operations may need to be performed sequentially within the context of the user token. If, for example, a first operation were to take an amount of time greater than the lifespan of the user token (e.g., the user token expires during performance of the first operation), a second operation performed after the first operation completes would fail for not being performed in the context of a valid user token. Such operations need not be limited to completely automated activities. For example, the first operation in this example might include requesting manual approval from an administrator before performing a particular automation activity. If, for example, the administrator were to take a day to approve the activity, the user token would likely no longer be valid (e.g., after the day used to approve the activity), resulting in a failure of a subsequent action.

Example approaches disclosed herein augment the functionality of the automation manager 130 to monitor for automation requests, inspect such requests to determine if a user token associated with the request is expired (or will soon expire), and update/replace the user token in the automation request in a secure manner. In this manner, long running requests can be completed with refreshed tokens, thereby improving computer performance by allowing long running and/or complex operations to be completed without requiring user intervention (e.g., re-entry of credentials).

Figure 2:
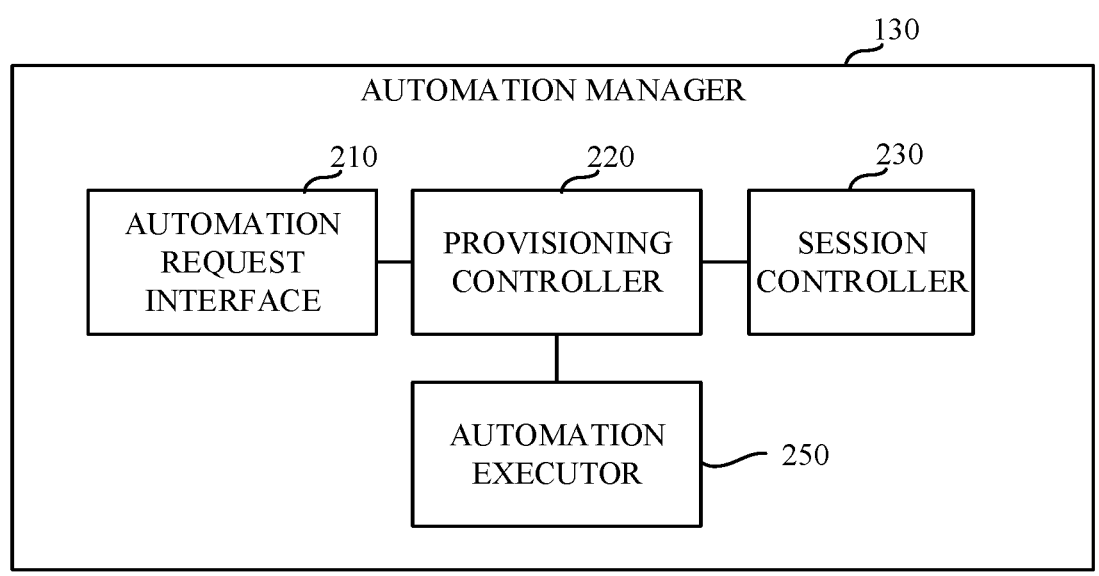
FIG. 2 is a block diagram of the example automation manager of the example SDDC of FIG. 1.

FIG. 2 is a block diagram of an example implementation of the automation manager 130 of FIG. 1. The example automation manager 130 of the illustrated example of FIG. 2 includes an automation request interface 210, a provisioning controller 220, a session controller 230, and an automation executor 250. In operation, the example automation request interface 210 receives an automation request directed to the automation executor 250. The example provisioning controller 220 inspects the request and, if necessary, interacts with the example session controller 230 to obtain a refreshed token for inclusion in the request, before passing the automation request to the automation executor 250.

The example automation request interface 210 of the illustrated example of FIG. 2 enables users (e.g., administrators) to submit automation requests to the automation manager 130 for execution. In some examples, the automation request interface 210 is implemented as a user interface presented via a web page to the user. In some examples, such requests may be submitted via a programmatic interface such as, for example, an application programming interface (API), a representational state transfer (REST) interface, etc.

In examples disclosed herein, when the user initializes a session with the automation request interface 210 (e.g., logs into the web page provided by the automation request interface 210), a session token is issued by the token issuer 160 of FIG. 1 to identify the session and establish a duration in which the login is effective. In an example implementation where the provisioning controller 220 were not used, the automation request interface 210 receives a request from the user (and/or a program directed by the user), and passes the request including the session token directly to the automation executor 250. The automation executor 250 reviews the session token to confirm that the session token is still valid for execution of the requested task. However, as noted above, in some long-running and/or multi-step automations, a session token may become expired, thereby requiring the user to re-authenticate. In examples disclosed herein, the automation request interface 210 passes the automation request to the provisioning controller 220.

The example provisioning controller 220 of the illustrated example of FIG. 2 intercepts a request from the automation request interface 210 prior to the request being delivered to the automation executor 250. The example provisioning controller 220 analyzes the request to determine whether a token included in the request is expired or will soon be expiring. If the token is expired or will soon be expiring, the example provisioning controller interacts with the session controller 230 to request a refreshed user token, which is then inserted into the request by the provisioning controller 220 before passing the request to the automation executor 250. In this manner, the request passed to the automation executor 250 is less likely to fail as a result of an expired and/or expiring session.

The example provisioning controller 220 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), Coarse Grained Reduced precision architecture (CGRA(s)), image signal processor(s) (ISP(s)), etc. However, in some examples, the provisioning controller 220 is implemented as a service of the automation manager.

The example session controller 230 of the illustrated example of FIG. 2 analyzes a request from the provisioning controller 220 for a new user token. The example session controller 230 analyzes the request to determine whether the request originated from a trusted source (e.g., the provisioning controller 220, as opposed to some other source).

The example session controller 230 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), Coarse Grained Reduced precision architecture (CGRA(s)), image signal processor(s) (ISP(s)), etc. However, in some examples, the session controller 230 is implemented as a service of the automation manager.

In the illustrated example of FIG. 2, the example session controller 230 is implemented in a same automation manager as the provisioning controller 220. Implementing the session controller 230 and the provisioning controller 220 on the same automation manager 130 enables the session controller 230 to more easily determine if a request for a refreshed user token originates from a trusted service (e.g., the provisioning controller 220). However, in some examples, the session controller 230 may be implemented in a separate automation manager from the provisioning controller 220. That is, the provisioning controller 220 and the session controller 230 may be implemented in separate containers, separate virtual machines, etc.

The example automation executor 250 of the illustrated example of FIG. 2 executes automation instructions included in the automation request received via the automation request interface 210. Such automation instructions may result in, for example, the provisioning of a virtual host, installation of an operating system on the virtual host, configuration of an application for execution on the operating system, etc. Each of such operations may be authorized in the context of a user session that is initialized based on a user (e.g., an administrator) providing their credentials. In examples disclosed herein, the automation executor 250 determines whether to execute the automation instructions based (at least in part) on whether the session is valid. Methods and apparatus disclosed herein enable automatic refresh of user tokens to prevent such failures.

The example automation executor 250 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), Coarse Grained Reduced precision architecture (CGRA(s)), image signal processor(s) (ISP(s)), etc. However, in some examples, the automation executor 250 is implemented as a service of the automation manager.

Figure 3:
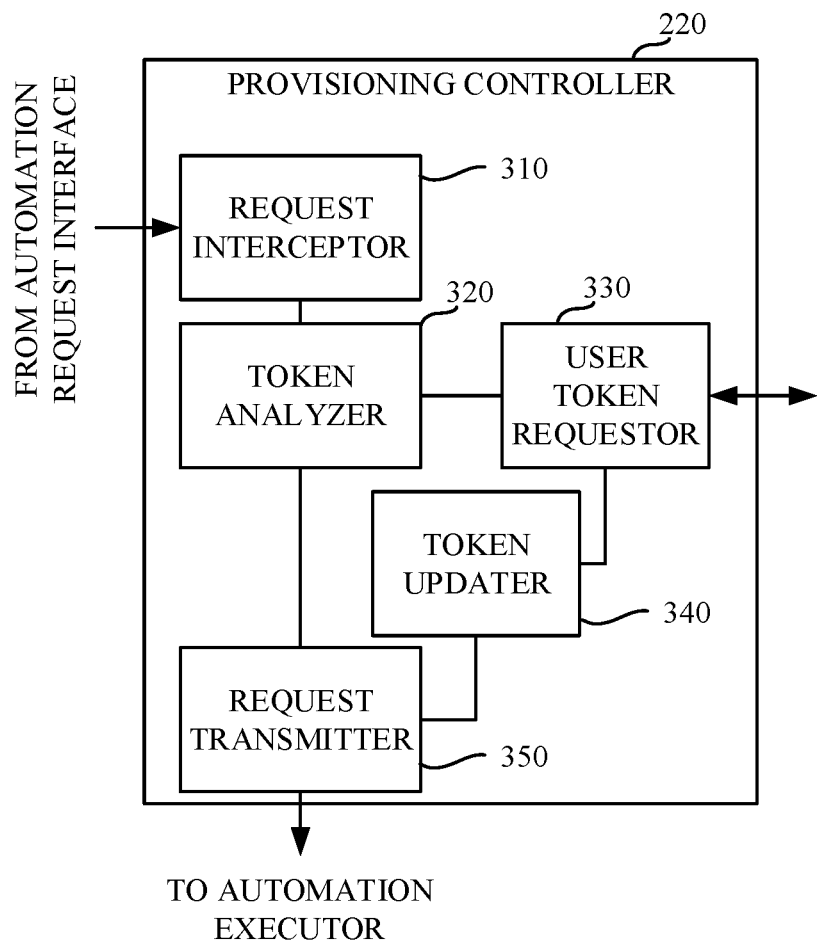
FIG. 3 is a block diagram of the example provisioning controller of FIG. 2.

FIG. 3 is a block diagram of an example implementation of the provisioning controller 220 of FIG. 2. The example provisioning controller 220 includes a request interceptor 310, a token analyzer 320, a user token requester 330, a token updater 340, and a request transmitter 350.

The example request interceptor 310 of the illustrated example of FIG. 3 intercepts a request received via the example automation request interface 210 of FIG. 2. In examples disclosed herein, the automation request includes a token. In some examples, the token represents a user session. The token includes information identifying when the session is to be considered expired.

The example token analyzer 320 of the illustrated example of FIG. 3 extracts a token from the intercepted request. The example token analyzer 320 determines whether the extracted token is a user token. If the token is not a user token, no further action is taken on the part of the token analyzer 320, and the request transmitter 350 sends the request to the automation executor 250 of FIG. 2 for execution. If the example token analyzer 320 determines that the extracted token is a user token, the example token analyzer 320 determines whether the token is expired or will soon be expiring. If, for example, the token were already expired, the request, when forwarded to the automation executor 250 without any further intervention, would result in a failure (e.g., due to expiration of the session represented by the token). That is, the intended operation of the automation would not be completed as expected by the user and/or administrator. To determine whether the token will soon be expiring, the example token analyzer 320 compares a difference between a time of expiration of the token and a current time to a threshold time difference. In examples disclosed herein, the threshold time difference is five minutes. However, any other threshold time difference may additionally or alternatively be used.

The example user token requester 330 of the illustrated example of FIG. 3, in response to the token analyzer 320 determining that the token is expired or will soon be expiring, requests a refreshed user token from the session controller 230. When requesting the refreshed token from the session controller 230, the example user token requester 330 provides a client credential token. The client credential token enables trust to be established between the provisioning controller 220 and the session controller 230. In this manner, the session controller 230, when evaluating the request for the refreshed token can determine whether the request originated from a trusted source.

In response to the request for the refreshed token, the example session controller 230 may respond with an updated/refreshed token. The example user token requester 330 determines whether the refreshed token has been received from the session controller 230. If the user token is received, the token is passed to the token updater 320.

The example token updater 340 of the illustrated example of FIG. 3, upon receipt of a refreshed token from the user token requestor 330, replaces the token in the intercepted request with the refreshed token. In this manner, the request that is to be transmitted by the request transmitter to the automation executor 250 will include a token that is not expired (or about to expire).

The example request transmitter 350 of the illustrated example of FIG. 3 transmits the request with the replaced token. In examples disclosed herein, the request is transmitted to the automation executor 250 in the same manner as if it were transmitted to the automation executor 250 by the automation request interface 210. However, in some examples, additional alterations to the request may additionally or alternatively be made to, for example, provide an indication that a refreshed token was used.

The example request interceptor 310, the example token analyzer 320, the example user token requestor 330, the example token updater 340, and/or the example request transmitter 350 of the illustrated example of FIG. 3 is/are implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), CGRA(s), ISP(s), etc. In some examples, the example request interceptor 310, the example token analyzer 320, the example user token requestor 330, the example token updater 340, and/or the example request transmitter 350 are implemented by separate logic circuits. In some examples, the example request interceptor 310 implements means for accessing. In some examples, the example token analyzer 320 implements means for analyzing. In some examples, the example user token requestor 330 implements means for requesting. In some examples, the example token updater 340 implements means for updating. In some examples the example request transmitter 350 implements means for sending.

Figure 4:
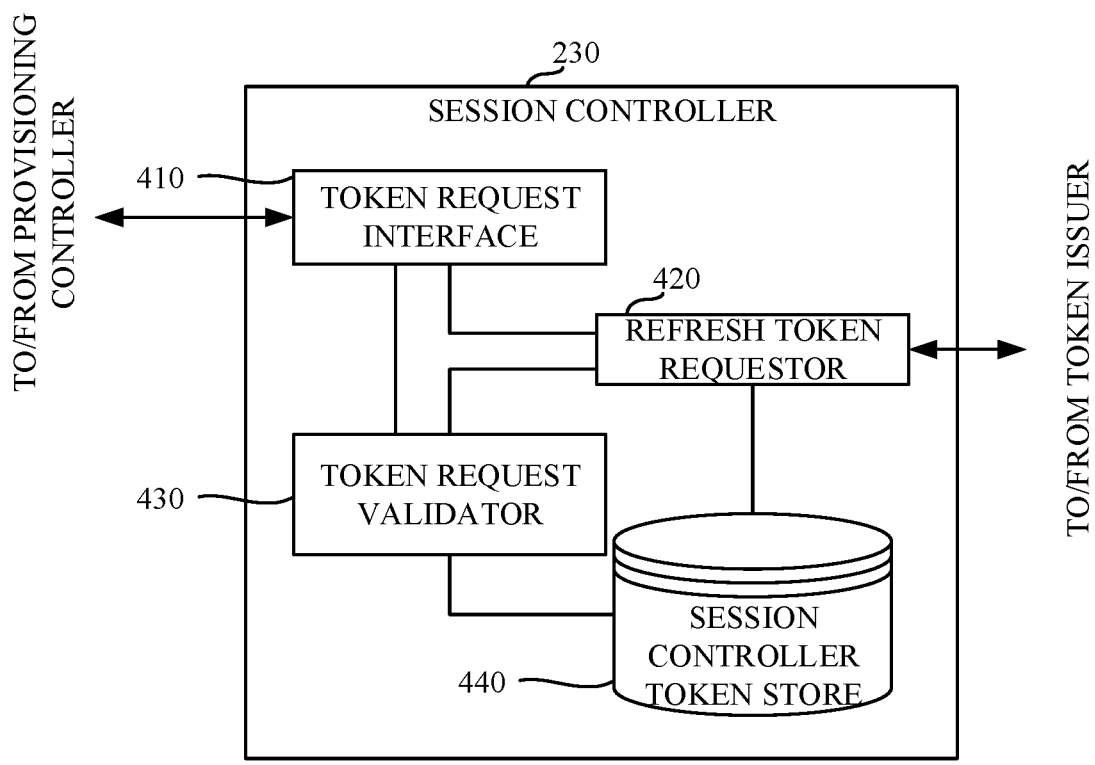
FIG. 4 is a block diagram of the example session controller of FIG. 2.

FIG. 4 is a block diagram of an example implementation of the session controller 230 of FIG. 2. The example session controller 230 FIG. 4 includes a token request interface 410, a refreshed token requester 420, a token request validator 430, and a session controller token store 440.

The example token request interface 410 of the illustrated example of FIG. 4 accesses a request for a refreshed token. In examples disclosed herein, the request is received from the provisioning controller 220. The request for the refreshed token includes client credentials that allow the session controller 230 to validate the request for the refreshed token.

The example refreshed token requester 420 of the illustrated example of FIG. 4, in response to the validation performed by the request validator 430, requests a new user token from the token issuer 160. In examples disclosed herein, the session controller 230 provides client credentials (e.g., the same client credentials provided by the provisioning controller 220 or separate client credentials unique to the session controller 230) to the token issuer 160 to obtain a refreshed token. In this manner, the session controller 230 (and/or the provisioning controller 220) does not need to be aware of the user credentials (e.g., the username and/or password used by the user).

The example token request validator 430 of the illustrated example of FIG. 4 inspects the request for the refreshed token to determine whether the request originates from a trusted service. In examples disclosed herein, the example token request validator 430 validates the client credentials provided in the request for the refreshed token against client credentials stored in the session controller token store 440. Such client credentials may be implemented using, for example, a certificate. However, any other approach to validating that a request originated from a trusted source may additionally or alternatively be used. If the token request validator 430 determines that the request does not originate from a trusted service, the example token request interface 420 replies to the provisioning controller indicating a request failure. In some examples, no failure indication may be provided.

The example session controller token store 440 of the illustrated example of FIG. 4 is implemented by any memory, storage device and/or storage disc for storing data such as, for example, flash memory, magnetic media, optical media, solid state memory, hard drive(s), thumb drive(s), etc. Furthermore, the data stored in the example session controller token store 440 may be in any data format such as, for example, binary data, comma delimited data, tab delimited data, structured query language (SQL) structures, etc. While, in the illustrated example, the session controller token store 440 is illustrated as a single device, the example session controller token store 440 and/or any other data storage devices described herein may be implemented by any number and/or type(s) of memories. In the illustrated example of FIG. 4, the example session controller token store 440 stores client credentials that are exchanged between the session controller 230 and the provisioning controller 220 to enable the session controller 230 to validate subsequent requests from the provisioning controller 220 for refreshed token(s).

The example token request interface 410, the example refresh token requestor 420, and/or the example token request validator 430 of the illustrated example of FIG. 3 is/are implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), CGRA(s), ISP(s), etc. In some examples, the example token request interface 410, the example refresh token requestor 420, and/or the example token request validator 430 are implemented by separate logic circuits. In some examples, the example token request interface 410 implements means for monitoring. In some examples, the example refresh token requestor 420 implements means for requesting. In some examples, the example token request validator 430 implements means for validating.

While an example manner of implementing the provisioning controller 220 of FIG. 2 is illustrated in FIG. 3 and an example manner of implementing the example session controller 230 is illustrated in FIG. 4, one or more of the elements, processes and/or devices illustrated in FIGS. 2, 3, and/or 4 may be combined, divided, re-arranged, omitted, eliminated and/or implemented in any other way. Further, the example request interceptor 310, the example token analyzer 320, the example user token requestor 330, the example token updater 340, the example request transmitter 350, and/or, more generally, the example provisioning controller 220 of FIGS. 2 and/or 3; example token request interface 410, the example refresh token requestor 420, the example token request validator 430, and/or, more generally, the example session controller 230 of FIGS. 2 and/or 4 may be implemented by hardware, software, firmware and/or any combination of hardware, software and/or firmware. Thus, for example, any of the example request interceptor 310, the example token analyzer 320, the example user token requestor 330, the example token updater 340, the example request transmitter 350, and/or, more generally, the example provisioning controller 220 of FIGS. 2 and/or 3; example token request interface 410, the example refresh token requestor 420, the example token request validator 430, and/or, more generally, the example session controller 230 of FIGS. 2 and/or 4 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example request interceptor 310, the example token analyzer 320, the example user token requestor 330, the example token updater 340, the example request transmitter 350, and/or, more generally, the example provisioning controller 220 of FIGS. 2 and/or 3; example token request interface 410, the example refresh token requestor 420, the example token request validator 430, and/or, more generally, the example session controller 230 of FIGS. 2 and/or 4 is/are hereby expressly defined to include a non-transitory computer readable storage device or storage disk such as a memory, a digital versatile disk (DVD), a compact disk (CD), a Blu-ray disk, etc. including the software and/or firmware. Further still, the example provisioning controller 220 of FIGS. 2 and/or 3, and/or the example session controller 240 of FIGS. 2 and/or 4 may include one or more elements, processes and/or devices in addition to, or instead of, those illustrated in FIGS. 2, 3, and/or 4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 5:
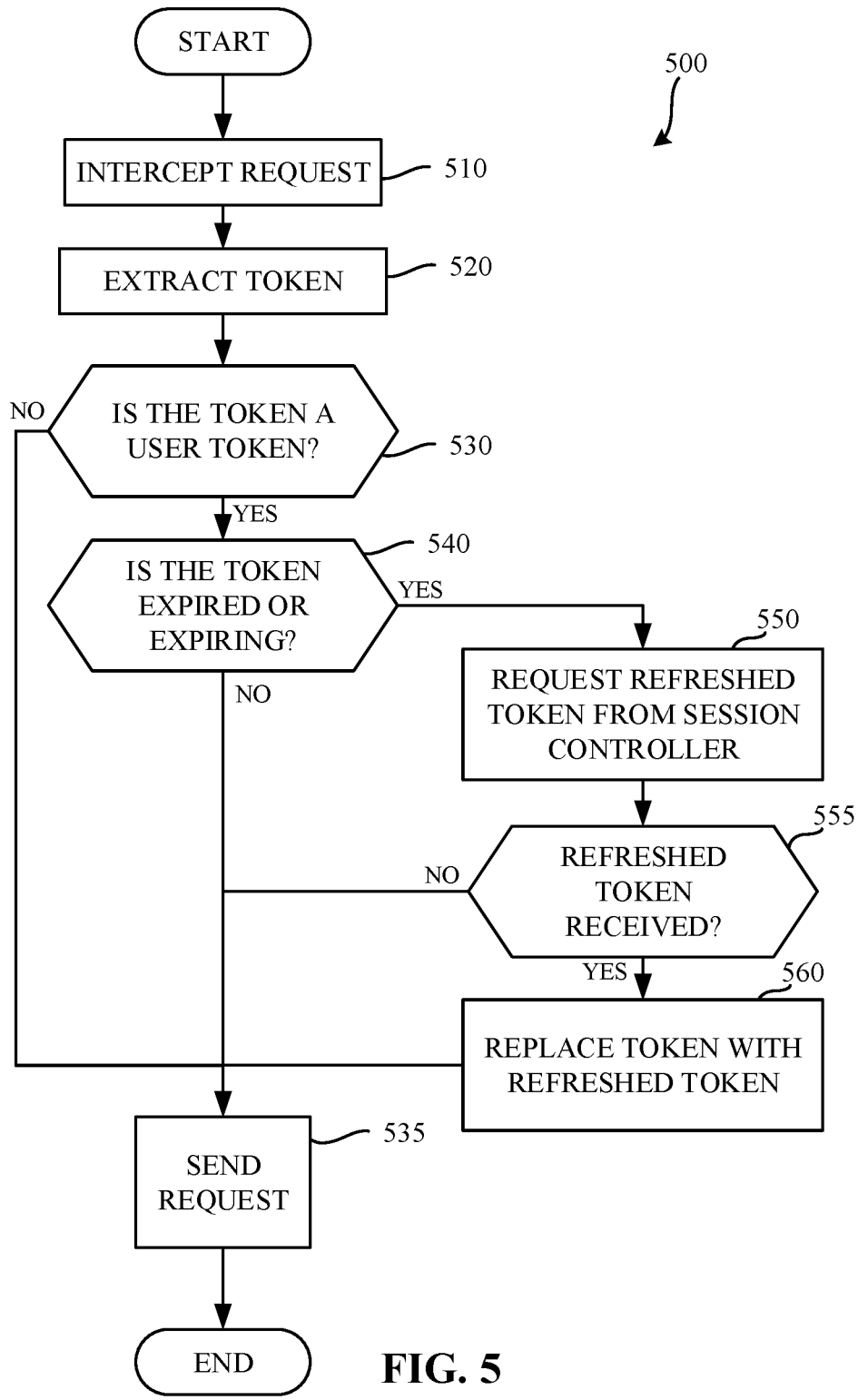
FIG. 5 is a flowchart representative of example machine-readable instructions that may be executed to implement the example provisioning controller of FIGS. 2 and/or 3.

A flowchart representative of example hardware logic, machine readable instructions, hardware implemented state machines, and/or any combination thereof for implementing the provisioning controller 220 of FIGS. 2 and/or 3 is shown in FIG. 5. The machine readable instructions may be one or more executable programs or portion(s) of an executable program for execution by a computer processor and/or processor circuitry, such as the processor 712 shown in the example processor platform 700 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIG. 5, many other methods of implementing the example provisioning controller 220 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc).

Figure 6:
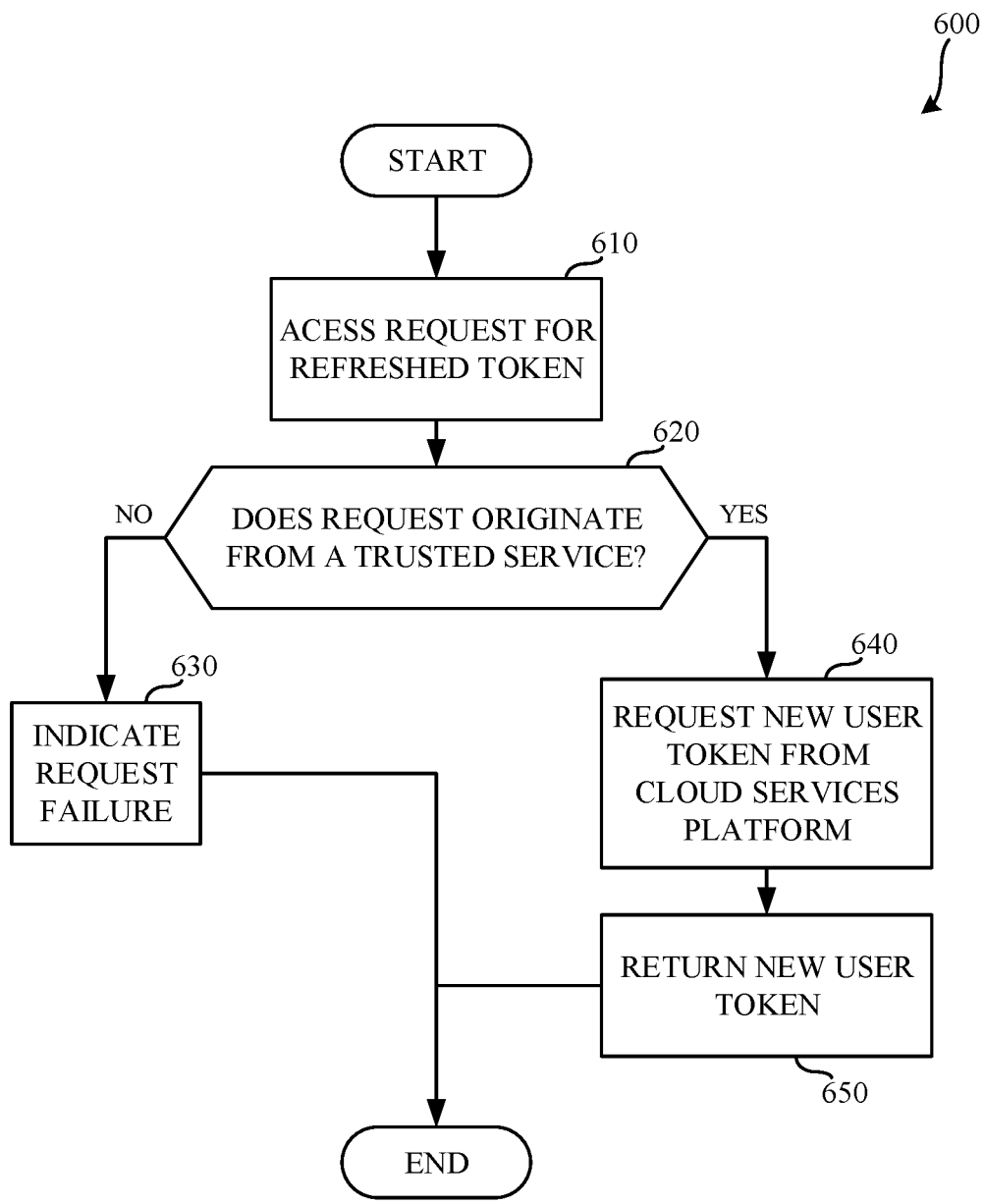
FIG. 6 is a flowchart representative of example machine instructions that may be executed to implement the example session controller of FIGS. 2 and/or 4.

A flowchart representative of example hardware logic, machine readable instructions, hardware implemented state machines, and/or any combination thereof for implementing the example session controller 230 of FIGS. 2 and/or 4 is shown in FIG. 6. The machine readable instructions may be one or more executable programs or portion(s) of an executable program for execution by a computer processor and/or processor circuitry, such as the processor 812 shown in the example processor platform 800 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowchart illustrated in FIG. 6, many other methods of implementing the example apparatus 50 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 5 and/or 6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 5 is a flowchart representative of example machine-readable instructions that may be executed to implement the example provisioning controller 220 of FIGS. 2 and/or 3. The example process 500 of the illustrated example of FIG. 5 begins when the example request interceptor 310 intercepts a request received via the example automation request interface 210 of FIG. 2. (Block 510). The example token analyzer 320 extracts a token from the intercepted request. (Block 520). The example token analyzer 320 determines whether the extracted token is a user token. (Block 530). In some examples, the extracted token may represent, for example, client credentials, or some other form of token. If the token is not a user token (e.g., block 530 returns a result of NO), no further action is taken on the part of the token analyzer, and the request transmitter 350 sends the request to the automation executor 250 of FIG. 2 for execution. (Block 535).

If the example token analyzer 320 determines that the extracted token is a user token (e.g., block 530 returns a result of YES), the example token analyzer 320 determines whether the token is expired or will soon be expiring. (Block 540). If, for example, the token were already expired, the request, when forwarded to the automation executor 250 without any further intervention, would result in a failure. That is, the intended operation of the automation would not be completed as expected by the user and/or administrator. To determine whether the token will soon be expiring, the example token analyzer 320 compares a difference between a time of expiration of the token and a current time to a threshold time difference. In examples disclosed herein the threshold time difference is five minutes. However, any other threshold time difference may additionally or alternatively be used.

If the example token analyzer determines that the token is not expired and will not be expiring soon (e.g., block 540 returns a result of NO), the example request transmitter 350 sends the request to the automation executor 250. (Block 535).

If the example token analyzer 320 determines that the token is expired or will soon be expiring (e.g., block 540 returns a result of YES), the example user token requester 300 requests a refreshed user token from the session controller 230. (Block 550). When requesting the refreshed token from the session controller 230, the example user token requester 330 provides a client credential token. The client credential token enables trust to be established between the provisioning controller 220 and the session controller 230. In this manner, the session controller 230, when evaluating the request for the refreshed token can determine whether the request originated from a trusted source.

The example user token requester 330 determines whether the refreshed token has been received from the session controller 230. (Block 555). If the user token is received (e.g., block 555 returns a result of YES), the example token updater 340 replaces the token in the intercepted request with the refreshed token. (Block 560). The example request transmitter 350 then transmits the request with the replaced token. (Block 535). In some examples, the token updater 340 may additionally or alternatively inform the automation request interface 210 of the updated token so that future requests transmitted by the automation request interface 210 can use the updated token.

Returning to block 555, if no refreshed token is received and/or some other failure occurs (e.g., block 555 returns a result of NO), control proceeds to block 535 where the request transmitter 350 transmits the intercepted request to the automation executor 250. (Block 535). The example process 500 of the illustrated example of FIG. 5 then terminates but may be repeated in response to a subsequent intercepted request.

FIG. 6 is a flowchart representative of example machine readable instructions that may be executed to implement the example session controller 230 of FIGS. 2 and/or 4. The example process 600 of FIG. 6 begins when the example token request interface 410 accesses a request for a refreshed token. (Block 610). In examples disclosed herein, the request is received from the provisioning controller 220. The request for the refreshed token includes client credentials that allow the session controller 230 to validate the request for the refreshed token.

The example token request validator 430 then inspects the request for the refreshed token whether the request originates from a trusted service. (Block 620). The determination of whether the request originates from the trusted service may be made based on, for example, the client credentials. In examples disclosed herein, the example token request validator 430 validates the client credentials provided in the request for the refreshed token against client credentials stored in the session controller token store 440. Such client credentials may be implemented using, for example, a certificate. However, any other approach to validating that a request originated from a trusted source may additionally or alternatively be used. If the token request validator 430 determines that the request does not originate from a trusted service (e.g., block 620 returns a result of NO), the example token request interface 420 replies to the provisioning controller indicating a request failure. (Block 630). In some examples, no failure indication may be provided.

If the example token request validator 430 determines that the request originated from the trusted service (e.g., block 620 returns a result of YES), the example refreshed token requester 420 requests a new user token from the token issuer 160. (Block 640). The example token request interface 410 then returns the new user token to the provisioning controller. (Block 650). In this manner, the example block 555 of FIG. 5 may return a result of YES, thereby allowing the token updater 340 to replace the token in the user request with the updated token provided by the session controller 230. The example process 600 the illustrated example of FIG. 6 then terminates but may be repeated, for example, upon a subsequent request for refreshed token.

Figure 7:
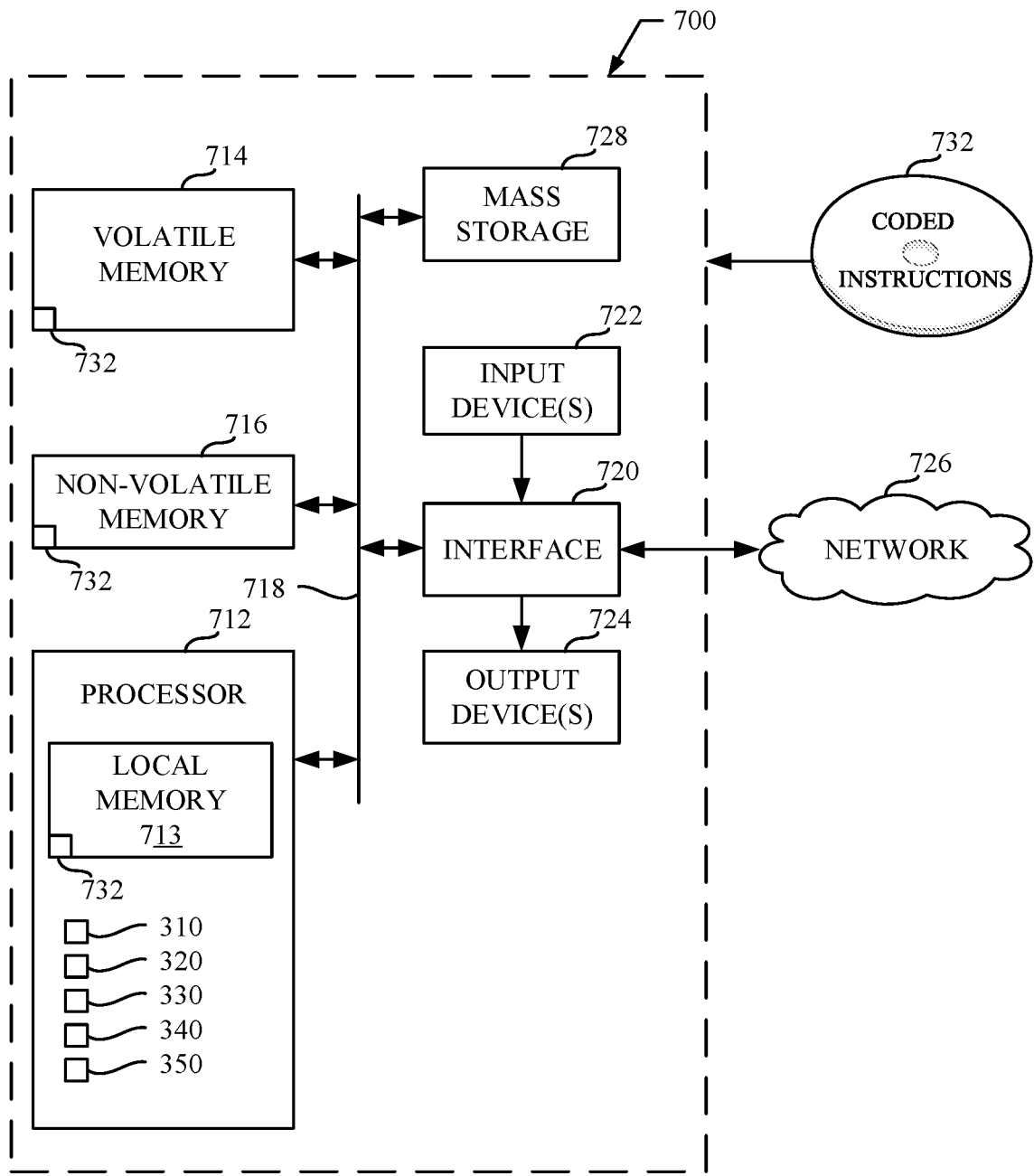
FIG. 7 is a block diagram of an example processor platform structured to execute the instructions of FIG. 5 to implement the example provisioning controller of FIGS. 2 and/or 3.

FIG. 7 is a block diagram of an example processor platform 700 structured to execute the instructions of FIG. 5 to implement the example provisioning controller 220 of FIGS. 2 and/or 3. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example request interceptor 310, the example token analyzer 320, the example user token requestor 330, the example token updater 340, and/or the example request transmitter 350.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives.

The machine executable instructions 732 of FIG. 5 may be stored in the mass storage device 728, in the volatile memory 714, in the non-volatile memory 716, and/or on a removable non-transitory computer readable storage medium such as a CD or DVD.

Figure 8:
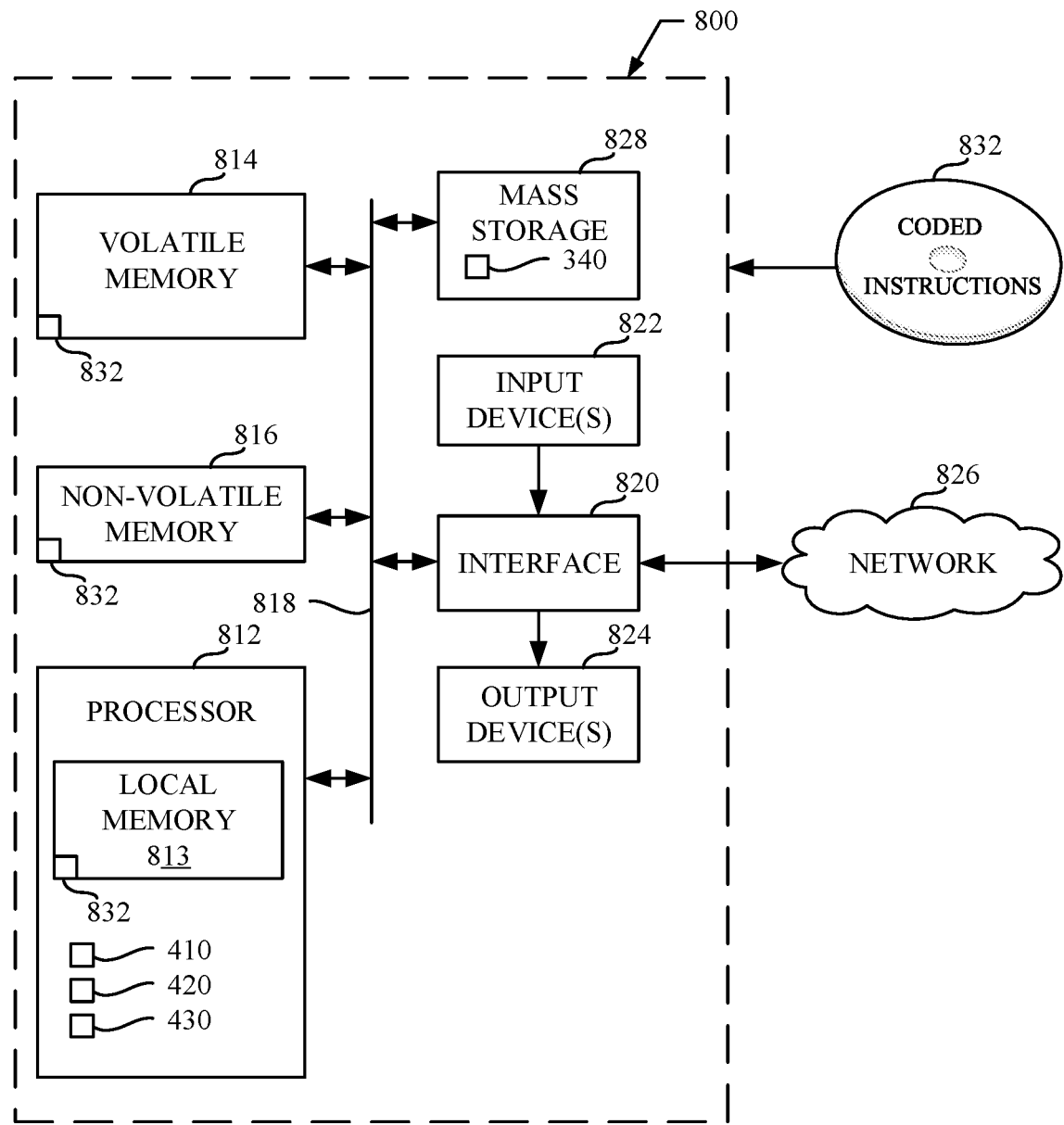
FIG. 8 is a block diagram of an example processor platform structured to execute the instructions of FIG. 6 to implement the session controller of FIGS. 2 and/or 4.

FIG. 8 is a block diagram of an example processor platform 800 structured to execute the instructions of FIG. 6 to implement the session controller 230 of FIGS. 2 and/or 4. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example token request interface 410, the example refresh token requestor 420, and the example token request validator 430.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 832 of FIG. 6 may be stored in the mass storage device 828, in the volatile memory 814, in the non-volatile memory 816, and/or on a removable non-transitory computer readable storage medium such as a CD or DVD. The example mass storage may implement the example session controller 440 of FIG. 4.

Figure 9:
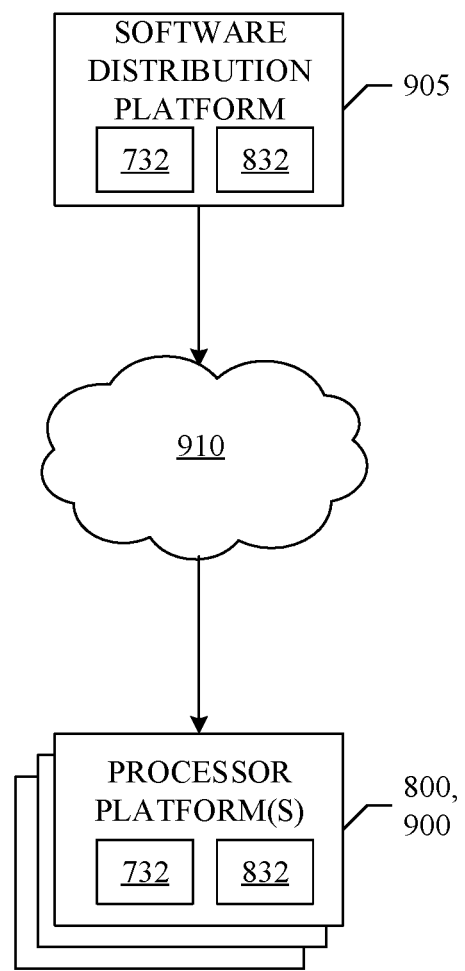
FIG. 9 is a block diagram of an example software distribution platform to distribute software (e.g., software corresponding to the example computer readable instructions of FIGS. 5 and/or 6) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 905 to distribute software such as the example computer readable instructions 732 of FIG. 7 and/or the example computer readable instructions 832 of FIG. 8 to third parties is illustrated in FIG. 9. The example software distribution platform 905 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 732 of FIG. 7 and/or the example computer readable instructions 832 of FIG. 8. The third parties may be consumers, users, retailers, OEMs, etc., who purchase and/or license the software for use and/or re-sale and/or sub-licensing. In the illustrated example, the software distribution platform 905 includes one or more servers and one or more storage devices. The storage devices store the computer readable instructions 732, which may correspond to the example computer readable instructions 500 of FIG. 5, and/or store the computer readable instructions 832, which may correspond to the example computer readable instructions 600 of FIG. 6, as described above.

The one or more servers of the example software distribution platform 905 are in communication with a network 910, which may correspond to any one or more of the Internet and/or any of the example networks 150, 726, 826 described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the computer readable instructions 732, 832 from the software distribution platform 905. For example, the software, which may correspond to the example computer readable instructions 500 of FIG. 5, may be downloaded to the example processor platform 700, which is to execute the computer readable instructions 732 to implement the example provisioning controller 220 of FIGS. 2 and/or 3. Additionally or alternatively, the software may correspond to the example computer readable instructions 600 of FIG. 6, may be downloaded to the example processor platform 800, which is to execute the computer readable instructions 832 to implement the example session controller 230 of FIGS. 2 and/or 4. In some example, one or more servers of the software distribution platform 905 periodically offer, transmit, and/or force updates to the software (e.g., the example computer readable instructions 732 of FIG. 7, the example computer readable instructions 832 of FIG. 8) to ensure improvements, patches, updates, etc. are distributed and applied to the software at the end user devices.

From the foregoing, it will be appreciated that example methods, apparatus and articles of manufacture have been disclosed that enable automatic refresh of user tokens to prevent failures of long running and/or complex automation tasks. The disclosed methods, apparatus and articles of manufacture improve the efficiency of using a computing device by reducing automation down-time of automated tasks resulting from session timeouts. That is, processor cycles can be used more efficiently to perform automation tasks, rather than waiting for a user to re-enter their credentials. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

Example methods, apparatus, systems, and articles of manufacture to to refresh a token for use in a virtualized computing environment are disclosed herein. Further examples and combinations thereof include the following:

Example 1 includes an apparatus to refresh a token, the apparatus comprising a request interceptor to access a request to perform an automation task, a token analyzer to extract a first token from the request to perform the automation task, and determine whether the first token is expired or will expire within a threshold amount of time, a user token requestor to, in response to the token analyzer determining that the first token is expired or will expire in the threshold amount of time, request a refreshed token, a token updater to replace the first token with the refreshed token to create an updated request, and a request transmitter to send the updated request to an automation executor.

Example 2 includes the apparatus of example 1, wherein the token analyzer is further to determine whether the first token is a user token, and the user token requestor is to request the refreshed token in response to the token analyzer determining that the first token is the user token.

Example 3 includes the apparatus of example 1, wherein the token analyzer is further to determine an amount of time until expiration of the first token, and compare the amount of time until expiration of the first token to the threshold.

Example 4 includes the apparatus of example 3, wherein the threshold is five minutes.

Example 5 includes the apparatus of example 1, wherein the user token requestor is to send a token refresh request to a session controller, the token refresh request including credentials.

Example 6 includes the apparatus of example 1, wherein at least one of the request interceptor, the token analyzer, the user token requestor, the token updater, and the request transmitter are implemented as a service within an automation manager.

Example 7 includes the apparatus of example 1, wherein the request interceptor is to intercept the request from an automation request interface.

Example 8 includes at least one non-transitory computer readable storage medium comprising instructions that, when executed, cause at least one processor to at least access a request to perform an automation task, extract a first token from the request to perform the automation task, determine whether the first token is expired or will expire within a threshold amount of time, in response to determining that the first token is expired or will expire within the threshold amount of time, request a refreshed token, replace the first token with the refreshed token to create an updated request, and send the updated request to an automation executor.

Example 9 includes the at least one computer readable storage medium of example 8, wherein the instructions, when executed, further cause the processor to determine whether the first token is a user token, and wherein the request for the refreshed token is transmitted in response to determining that the first token is the user token.

Example 10 includes the at least one computer readable storage medium of example 8, wherein the instructions, when executed, further cause the processor to determine an amount of time until expiration of the first token, and compare the amount of time until expiration of the first token to the threshold.

Example 11 includes the at least one computer readable storage medium of example 10, wherein the threshold is five minutes.

Example 12 includes the at least one computer readable storage medium of example 8, wherein the instructions, when executed, further cause the processor to transmit a token refresh request to a session controller, the token refresh request including credentials.

Example 13 includes the at least one computer readable storage medium of example 8, wherein the instructions, when executed, further cause the processor to intercept the request from an automation request interface.

Example 14 includes a method to refresh a token, the method comprising accessing a request to perform an automation task, extracting a first token from the request to perform the automation task, determining, by executing an instruction with a processor, whether the first token is expired or will expire within a threshold amount of time, in response to determining that the first token is expired or will expire within the threshold amount of time, requesting a refreshed token, replacing the first token with the refreshed token to create an updated request, and sending the updated request to an automation executor.

Example 15 includes the method of example 14, further including determining whether the first token is a user token, and wherein the requesting of the refreshed token is further performed in response to determining that the first token is the user token.

Example 16 includes the method of example 14, wherein the determining that the first token will soon be expired includes determining an amount of time until expiration of the first token, and comparing the amount of time until expiration of the first token to the threshold.

Example 17 includes the method of example 16, wherein the threshold is five minutes.

Example 18 includes the method of example 14, wherein the requesting of the refreshed token includes sending a token refresh request to a session controller, the token refresh request including client credentials.

Example 19 includes the method of example 14, wherein the request to perform the automation task is intercepted between transmission from an automation request interface to the automation executor.

Example 20 includes an apparatus to refresh a token, the apparatus comprising means for accessing a request to perform an automation task, means for analyzing to extract a first token from the request to perform the automation task and determine whether the first token is expired or will expire in the threshold amount of time, means for requesting a refreshed token in response to the means for analyzing determining that the first token is expired or will expire within the threshold amount of time, means for updating the first token with the refreshed token to create an updated request, and means for sending the updated request to an automation executor.

Example 21 includes the apparatus of example 20, wherein the means for analyzing is further to determine whether the first token is a user token, and the means for requesting is to request the refreshed token in response to the token analyzer determining that the first token is the user token.

Example 22 includes the apparatus of example 20, wherein the means for analyzing is to further determine an amount of time until expiration of the first token, and compare the amount of time until expiration of the first token to the threshold.

Example 23 includes the apparatus of example 22, wherein the threshold is five minutes.

Example 24 includes the apparatus of example 20, wherein the means for requesting is to send a token refresh request to a session controller, the token refresh request including client credentials.

Example 25 includes the apparatus of example 20, wherein the means for accessing is to intercept the request from an automation request interface.

Example 26 includes a server to distribute first software on a network, the server comprising at least one storage device including second instructions, and at least one processor to execute the second instructions to transmit the first instructions over the network, the first instructions, when executed, to cause at least one device to access a request to perform an automation task, extract a first token from the request to perform the automation task, determine whether the first token is expired or will expire in a threshold amount of time, in response to determining that the first token is expired or will expire in the threshold amount of time, request a refreshed token, replace the first token with the refreshed token to create an updated request, and send the updated request to an automation executor.

The following claims are hereby incorporated into this Detailed Description by this reference, with each claim standing on its own as a separate embodiment of the present disclosure.

What is claimed is:

1. An apparatus to refresh a token, the apparatus comprising:
   a request interceptor to access a request to perform an automation task;
   a token analyzer to:
      extract a first token from the request to perform the automation task; and
      determine, without providing the request to an automation executor, whether the first token will expire within a threshold amount of time;
   a user token requestor to, in response to the token analyzer determining that the first token will expire in the threshold amount of time, request a refreshed token;
   a token updater to replace the first token with the refreshed token to create an updated request; and a request transmitter to send the updated request to the automation executor.

2. The apparatus of claim 1, wherein the token analyzer is further to determine whether the first token is a user token, and the user token requestor is to request the refreshed token in response to the token analyzer determining that the first token is the user token.

3. The apparatus of claim 1, wherein the token analyzer is further to determine an amount of time until expiration of the first token, and compare the amount of time until expiration of the first token to the threshold.

4. The apparatus of claim 3, wherein the threshold is five minutes.

5. The apparatus of claim 1, wherein the user token requestor is to send a token refresh request to a session controller, the token refresh request including credentials.

6. The apparatus of claim 1, wherein at least one of the request interceptor, the token analyzer, the user token requestor, the token updater, and the request transmitter are implemented as a service within an automation manager.

7. The apparatus of claim 1, wherein the request interceptor is to intercept the request from an automation request interface.

8. At least one non-transitory computer readable storage medium comprising instructions that, when executed, cause at least one processor to at least:
  access a request to perform an automation task;
  extract a first token from the request to perform the automation task;
  determine, without providing the request to an automation executor, whether the first token will expire within a threshold amount of time;
  in response to determining that the first token will expire within the threshold amount of time, request a refreshed token;
  replace the first token with the refreshed token to create an updated request; and
  send the updated request to the automation executor.

9. The at least one computer readable storage medium of claim 8, wherein the instructions, when executed, further cause the processor to determine whether the first token is a user token, and wherein the request for the refreshed token is transmitted in response to determining that the first token is the user token.

10. The at least one computer readable storage medium of claim 8, wherein the instructions, when executed, further cause the processor to:
  determine an amount of time until expiration of the first token; and
  compare the amount of time until expiration of the first token to the threshold.

11. The at least one computer readable storage medium of claim 10, wherein the threshold is five minutes.

12. The at least one computer readable storage medium of claim 8, wherein the instructions, when executed, further cause the processor to transmit a token refresh request to a session controller, the token refresh request including credentials.

13. The at least one computer readable storage medium of claim 8, wherein the instructions, when executed, further cause the processor to intercept the request from an automation request interface.

14. A method to refresh a token, the method comprising:
  accessing a request to perform an automation task;
  extracting a first token from the request to perform the automation task;
  determining, by executing an instruction with a processor and without providing the request to an automation executor, whether the first token will expire within a threshold amount of time;
  in response to determining that the first token will expire within the threshold amount of time, requesting a refreshed token;
  replacing the first token with the refreshed token to create an updated request; and
  sending the updated request to the automation executor.

15. The method of claim 14, further including determining whether the first token is a user token, and wherein the requesting of the refreshed token is further performed in response to determining that the first token is the user token.

16. The method of claim 14, wherein the determining that the first token will soon be expired includes:
  determining an amount of time until expiration of the first token; and
  comparing the amount of time until expiration of the first token to the threshold.

17. The method of claim 16, wherein the threshold is five minutes.

18. The method of claim 14, wherein the requesting of the refreshed token includes sending a token refresh request to a session controller, the token refresh request including client credentials.

19. The method of claim 14, wherein the request to perform the automation task is intercepted between transmission from an automation request interface to the automation executor.

* * * * *